(12) United States Patent
Neubacher

(10) Patent No.: US 10,566,836 B2
(45) Date of Patent: Feb. 18, 2020

(54) CONTROL OF ELECTRICAL POWER USAGE

(71) Applicant: Deutsche Telekom AG, Bonn (DE)

(72) Inventor: Andreas Neubacher, Korneuburg (AT)

(73) Assignee: DEUTSCHE TELEKOM AG, Bonn (DE)

( * ) Notice: Subject to any disclaimer, the term of this patent is extended or adjusted under 35 U.S.C. 154(b) by 39 days.

(21) Appl. No.: 15/747,451

(22) PCT Filed: Jul. 28, 2016

(86) PCT No.: PCT/EP2016/068107
§ 371 (c)(1),
(2) Date: Jan. 25, 2018

(87) PCT Pub. No.: WO2017/017239
PCT Pub. Date: Feb. 2, 2017

(65) Prior Publication Data
US 2018/0219412 A1    Aug. 2, 2018

(30) Foreign Application Priority Data

Jul. 29, 2015 (EP) .................................... 15178887

(51) Int. Cl.
*H02J 13/00* (2006.01)
*H02J 3/14* (2006.01)
(Continued)

(52) U.S. Cl.
CPC ........ *H02J 13/0017* (2013.01); *G05B 19/042* (2013.01); *H02J 3/14* (2013.01);
(Continued)

(58) Field of Classification Search
CPC ...... H02J 13/0017; H02J 3/14; H02J 13/0075; H02J 13/0072; H02J 2003/143;
(Continued)

(56) References Cited

U.S. PATENT DOCUMENTS 8,588,991 B1 * 11/2013 Forbes, Jr. ............. G05B 19/02
  700/295
9,820,146 B2 * 11/2017 Gross ..................... H04W 12/06
(Continued)

*Primary Examiner* — Ramesh B Patel
(74) *Attorney, Agent, or Firm* — Leydig, Voit & Mayer, Ltd.

(57) ABSTRACT

A method for controlling electrical power usage by at least one power consuming device connected—via a telecommunications network—to at least one electrical power generating and/or storing component includes: in a first step, an electrical power consumption profile information is transmitted to or accessed by an electrical power management entity, the electrical power consumption profile information being related to the at least one power consuming device or to a mode of operation thereof; and in a second step, subsequent to the first step, a first electrical power control information and/or a second electrical power control information is transmitted, by the electrical power management entity, to the at least one power consuming device, the first electrical power control information indicating to activate a power consumption mode of operation corresponding to the electrical power consumption profile information transmitted to or accessed by the electrical power management entity.

16 Claims, 1 Drawing Sheet

(51) Int. Cl.
*G05B 19/042* (2006.01)
*H02J 3/00* (2006.01)

(52) U.S. Cl.
CPC ...... *H02J 13/0072* (2013.01); *H02J 13/0075* (2013.01); *G05B 2219/2639* (2013.01); *H02J 2003/007* (2013.01); *H02J 2003/143* (2013.01); *Y02B 70/3225* (2013.01); *Y04S 20/222* (2013.01)

(58) Field of Classification Search
CPC ............ H02J 2003/007; G05B 19/042; G05B 2219/2639; Y04S 20/222; Y02B 70/3225
See application file for complete search history.

(56) References Cited

U.S. PATENT DOCUMENTS

| | | | | |
|---|---|---|---|---|
| 10,009,067 B2 * | 6/2018 | Birk | .................... | H02J 13/002 |
| 10,116,560 B2 * | 10/2018 | Forbes, Jr. | .............. | H04L 45/72 |
| 10,163,242 B2 * | 12/2018 | Jagerson, Jr. | ........... | G06T 11/60 |
| 2012/0326503 A1 * | 12/2012 | Birkelund | .............. | G06Q 10/04 |
| | | | | 307/24 |
| 2013/0116844 A1 * | 5/2013 | McNally | .................. | H02J 3/08 |
| | | | | 700/295 |
| 2014/0379099 A1 * | 12/2014 | Premereur | ................ | H02J 3/14 |
| | | | | 700/19 |
| 2016/0117657 A1 * | 4/2016 | Forbes, Jr. | ........... | G06Q 20/145 |
| | | | | 705/7.31 |
| 2017/0092055 A1 * | 3/2017 | Brockman | .......... | G06F 16/5866 |

\* cited by examiner

CONTROL OF ELECTRICAL POWER USAGE

CROSS-REFERENCE TO RELATED APPLICATIONS

This application is a U.S. National Phase application under 35 U.S.C. § 371 of International Application No. PCT/EP2016/068107, filed on Jul. 28, 2016, and claims benefit to European Patent Application No. EP 15178887.4, filed on Jul. 29, 2015. The International Application was published in English on Feb. 2, 2017 as WO 2017/017239 A1 under PCT Article 21(2).

FIELD

The present invention relates a method for improved controlling of electrical power usage by at least one power consuming device being connected—via a telecommunications network—to at least one electrical power generating and/or storing component, wherein additionally an electrical power transmission component serves to transmit electrical power between the at least one electrical power generating and/or storing component and the at least one power consuming device.

Furthermore, the present invention relates to a system for improved controlling of electrical power usage by at least one power consuming device being connected—via a telecommunications network—to at least one electrical power generating and/or storing component, wherein additionally an electrical power transmission component serves to transmit electrical power between the at least one electrical power generating and/or storing component and the at least one power consuming device.

Furthermore, the present invention relates to a program and a computer program product to perform exemplary embodiments of the inventive method.

BACKGROUND

In the context of internet of Things (IoT), various different use cases have been identified leveraging from smart devices connected via a telecommunications network or transport network, e.g. the internet. Among prominent use cases or frameworks are use cases or frameworks promoted by regulatory and administrative bodies within the European Union.

One example is the introduction of smart meters for metering electrical power consumption by industrial, agricultural, or home appliances. Thereby, it is tried to achieve savings of, e.g., consumed electrical energy. By introduction of smart meters, energy producers could develop new models of variable, time variant energy pricing models, e.g. with the aim to flatten peak consumptions around noon, by increasing the energy prices for the end customer.

However, the underlying problem trying to be solved by smart meters is to achieve a balance between energy demand and energy production. Especially in the context of energy production by renewable energy sources, it becomes apparent that energy preferably should be consumed at the same time it is produced.

SUMMARY

In an exemplary embodiment, the present invention provides a method for controlling electrical power usage by at least one power consuming device connected—via a telecommunications network—to at least one electrical power generating and/or storing component. An electrical power transmission component is configured to transmit electrical power between the at least one electrical power generating and/or storing component and the at least one power consuming device. The at least one electrical power generating and/or storing component is associated with an expected electrical power supply profile and a current electrical power supply profile. An electrical power management entity is coupled—via the telecommunications network—to the at least one power consuming device such that demand of electrical power consumption by the at least one power consuming device is influenced, by the electrical power management entity, via transmitting electrical power control information between the electrical power management entity and the at least one power consuming device. The method includes: in a first step, an electrical power consumption profile information is transmitted to or accessed by the electrical power management entity, the electrical power consumption profile information being related to the at least one power consuming device or to a mode of operation thereof; and in a second step, subsequent to the first step, a first electrical power control information and/or a second electrical power control information is transmitted, by the electrical power management entity, to the at least one power consuming device, the first electrical power control information indicating to activate a power consumption mode of operation corresponding to the electrical power consumption profile information transmitted to or accessed by the electrical power management entity. The second electrical power control information indicates to modify or to adapt a power consumption mode of operation of the at least one power consuming device. The electrical power management entity transmits, dependent on the electrical power consumption profile information, the electrical power control information to the at least one power consuming device such that the demand for electrical power by the at least one power consuming device is influenced via postponing or preponing expected future demand of electrical power. Prior, during or after the first step, an electrical power request information is transmitted to or accessed by the electrical power management entity, the electrical power request information being related to both a user interaction and the at least one power consuming device. The electrical power management entity transmits, dependent on the electrical power request information, the electrical power control information to the at least one power consuming device such that the demand for electrical power by the at least one power consuming device is influenced.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
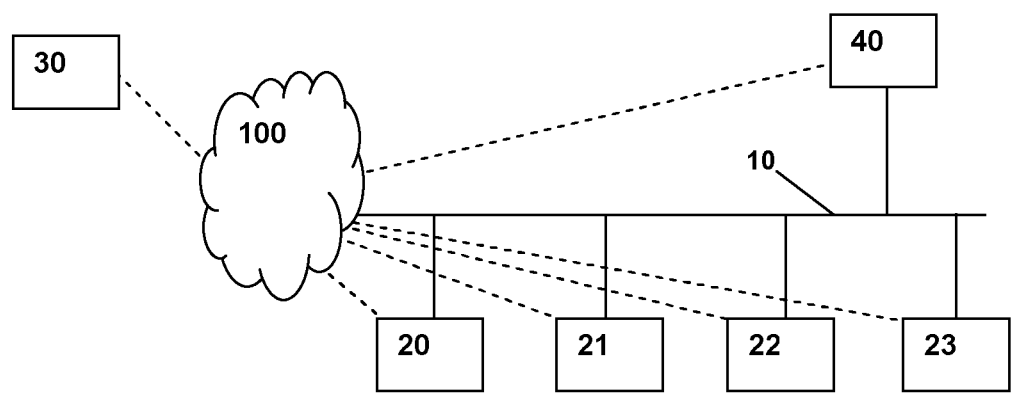
FIG. 1 schematically illustrates a system for improved controlling of electrical power usage by at least one power consuming device, the system including an electrical power generating and/or storing component and an electrical power management entity.

Exemplary embodiments of the present invention provide a technically simple, effective and cost effective solution for an improved controlling of electrical power usage by at least one power consuming device being connected—via a telecommunications network and via an electrical power transmission component—to at least one electrical power generating and/or storing component. Further exemplary embodiments of the present invention provide a corresponding system comprising at least one power consuming device and at least one electrical power generating and/or storing component being connected via a telecommunications network and via an electrical power transmission component wherein the system is provided such that an improved controlling of electrical power usage is possible.

In an exemplary embodiment, the present invention provides a method for improved controlling of electrical power usage by at least one power consuming device being connected—via a telecommunications network—to at least one electrical power generating and/or storing component, wherein additionally an electrical power transmission component serves to transmit electrical power between the at least one electrical power generating and/or storing component and the at least one power consuming device, wherein the electrical power generating and/or storing component is associated with an expected and a current electrical power supply profile, and wherein an electrical power management entity is coupled—via the telecommunications network—to the at least one power consuming device such that demand of electrical power consumption by the at least one power consuming device is influenced, by the electrical power management entity, via transmitting electrical power control information between the electrical power management entity and the at least one power consuming device, wherein the method comprises the steps of:

in a first step, an electrical power consumption profile information is transmitted to or accessed by the electrical power management entity, the electrical power consumption profile information being related to the at least one power consuming device or to a mode of operation thereof, in a second step, subsequent to the first step, a first and/or a second electrical power control information is transmitted, by the electrical power management entity, to the at least one power consuming device, the first electrical power control information indicating to activate a power consumption mode of operation corresponding to the electrical power consumption profile information transmitted to or accessed by the electrical power management entity, whereas the second electrical power control information indicating to modify or to adapt a power consumption mode of operation of the power consuming device, wherein the electrical power management entity transmits, dependent on the electrical power consumption profile information, the electrical power control information to the at least one power consuming device such that the demand of electrical power by the at least one power consuming device is influenced via postponing or preponing expected future demand of electrical power.

In an exemplary embodiment, the present invention provides a method for improved controlling of electrical power usage by at least one power consuming device being connected—via a telecommunications network—to at least one electrical power generating and/or storing component, wherein additionally an electrical power transmission component serves to transmit electrical power between the at least one electrical power generating and/or storing component and the at least one power consuming device, wherein the electrical power generating and/or storing component is associated with an expected and a current electrical power supply profile, and wherein an electrical power management entity is coupled—via the telecommunications network—to the at least one power consuming device such that demand of electrical power consumption by the at least one power consuming device is influenced, by the electrical power management entity, via transmitting electrical power control information between the electrical power management entity and the at least one power consuming device, wherein the method comprises the steps of:

in a first step, an electrical power consumption profile information is transmitted to or accessed by the electrical power management entity, the electrical power consumption profile information being related to the at least one power consuming device or to a mode of operation thereof, in a second step, subsequent to the first step, a first and/or a second electrical power control information is transmitted, by the electrical power management entity, to the at least one power consuming device, the first electrical power control information indicating to activate a power consumption mode of operation corresponding to the electrical power consumption profile information transmitted to or accessed by the electrical power management entity, whereas the second electrical power control information indicating to modify or to adapt a power consumption mode of operation of the power consuming device.

Generally, the production of electrical power and the demand or consumption of electrical power should be adapted or balanced. Otherwise, the stability of the network providing the transmission of electrical power would be unstable and hence unreliable. Traditionally, actual power consumption for a large number of energy consumers such as private homes, industrial consumers, etc. varies considerably during a given time period, such as, e.g., a day. The typical pattern of such variations can be predicted, however such prediction involves a considerable error and hence, it is difficult to precisely anticipate the actual power consumption needs at a given point in time. As the electrical power production of renewable power sources is typically more unpredictable as compared to conventional electrical power sources, the increased usage of renewable power sources means that the precise prediction of overall actual power production is even more difficult. Typically, such a situation requires using costly balance energy sources (such as, e.g., power buffers or power storages or peak demand power sources) that are able to close any gap between the current production and consumption of electrical power.

According to the present invention, it is advantageously possible to provide smart scheduling of electrical power consuming devices and appliances such that the need of generation of costly balance energy or the need for costly power buffers/storages is reduced. Thereby, the present invention is potentially applied on a more local level, e.g. at one extremely local level involving only a single home or a single industrial site or the like, or involving (on a slightly less local level) a plurality (of two, three, four, five, six, ten, twenty or thirty) of homes or industrial sites. Additionally, the present invention is potentially applied on a geographically more general level, e.g. involving (most of) the homes and industrial sites of a whole region or even a nation state. At any level, there is at least one electrical power generating and/or storing component—for an individual home or an industrial site, e.g. a photovoltaic device and/or a wind power device and/or a biogas device, and for whole region typically a multitude of power plants, photovoltaic devices and/or wind power devices. At any level, the power generating devices (that might also comprise power storage capabilities) are collectively called the electrical power generating and/or storing component. According to the present invention, the electrical power generating and/or storing component is associated with a typical—and hence expected—electrical power supply profile as well as with a current electrical power supply profile. Furthermore at any level of application of the present invention, typically a certain number of power consuming devices are to be considered, each one of which being hereinafter referred to by the term "at least one power consuming device". These power consuming devices are connected not only via an electrical power transmission component but also via a telecommunications network to at least one electrical power generating and/or storing component.

Furthermore according to the present invention, an electrical power management entity is coupled—via the telecommunications network—to the at least one power consuming device. Via the electrical power management entity, the demand of electrical power consumed by the at least one power consuming device can be influenced via transmitting electrical power control information between the electrical power management entity and the at least one power consuming device.

In order to realize this, according to the present invention, an electrical power consumption profile information is made available to the electrical power management entity, typically by transmitting such electrical power consumption profile information to the electrical power management entity or by accessing the electrical power consumption profile information by the electrical power management entity. The electrical power consumption profile information is typically related to one power consuming device or to a mode of operation thereof. The electrical power consumption profile information typically comprises indications about the typical elasticity (in time and/or regarding the required power level) of the power consumption of the respective power consuming device in general or regarding specific modes of operation of the respective power consuming device considered.

According to the present invention, the electrical power management entity transmits a first and/or a second electrical power control information to the at least one power consuming device. The first electrical power control information indicate to activate a power consumption mode of operation corresponding to the electrical power consumption profile information. The second electrical power control information indicate to modify or to adapt a power consumption mode of operation of the power consuming device, i.e. the power consuming device is typically already activated (either by a first electrical power control information, i.e. by the electrical power management entity, or via another activation path, including the activation by the user of the power consuming device), and balancing power generation and electrical power demand requires (or makes it desirable) to modify or to adapt the power consumption mode of operation of the power consuming device.

According to a preferred embodiment of the present invention, prior, during or after the first step, an electrical power request information is transmitted to or accessed by the electrical power management entity, the electrical power request information being related to both a user interaction and the at least one power consuming device, wherein the user interaction especially corresponds to activate the at least one power consuming device.

Via the electrical power request information it is advantageously possible to provide the information to the electrical power management entity that electrical power needs to be consumed by the power consuming device in some future point in time. According to a preferred embodiment of the present invention, the electrical power request information relates to a specific power consuming device, e.g. a washing machine, and indicates that a certain mode of operation of the power consuming device (in the example of a washing machine e.g. a certain washing program) should be started. Via the corresponding electrical power consumption profile information (related to the considered power consuming device, i.e. the washing machine in this example, and especially more specifically related to the requested mode of operation or program of that power consuming device, e.g. a hot water cycle in contrast to a delicate cycle in a washing machine) the electrical power management entity is aware not only about the requested overall consumption of electrical power but also about the distribution in time of the requested electrical power consumption.

Furthermore, it is preferred according to the present invention that the electrical power management entity transmits, dependent on the electrical power consumption profile information and/or the electrical power request information, the electrical power control information to the at least one power consuming device such that the demand of electrical power by the at least one power consuming device is influenced, especially influenced via postponing or preponing expected future demand of electrical power and/or via reducing or increasing current demand of electrical power, wherein the demand of electrical power is especially influenced in view of adapting supply and demand of electrical power to each other such that differences between current supply and demand of electrical power are as low as possible and as non-volatile as possible.

According to a further preferred embodiment of the present invention, the electrical power management entity transmits, dependent on the electrical power request information, the electrical power control information to the at least one power consuming device such that the demand of electrical power by the at least one power consuming device is influenced, especially influenced via postponing or preponing expected future demand of electrical power and/or via reducing or increasing current demand of electrical power, wherein the demand of electrical power is especially influenced in view of adapting supply and demand of electrical power to each other such that differences between current supply and demand of electrical power are as low as possible and as non-volatile as possible.

According to a further preferred embodiment of the present invention, the electrical power management entity transmits, dependent on the electrical power consumption profile information, the electrical power control information to the at least one power consuming device such that the demand of electrical power by the at least one power consuming device is influenced, especially influenced via reducing or increasing current demand of electrical power.

According to the present invention, it is thereby advantageously possible that the current consumption of electrical power can be more or less instantaneously matched with the current production of electrical power. This is able to be achieved according to the present invention at any level of application of the electrical power management entity, i.e. regardless of the electrical power management entity being responsible on a local level, e.g. involving only a single home or a single industrial site, or on a slightly less local level involving a plurality of homes or industrial sites, or on a geographically more general level, e.g. involving typically most of the homes and industrial sites of a whole region or even a nation state. Matching of the current consumption of electrical power with the current production of electrical power is advantageously possible according to the present invention due to the fact the electrical power management entity is able to relatively precisely know which amount of consumption of electrical power is to expected in a given time interval of, e.g., a minute, an hour, several hours, a day or a week. Likewise, also the power generation is typically predictable—even in case of using renewable power source—for longer or shorter intervals of time due to experience of comparable weather conditions (especially influencing solar radiation and wind harvesting possibilities). Thus via the knowledge, at the electrical power management entity, of both the expected consumption of electrical power and the generation of electrical power, it is advantageously possible to reduce the need of balance energy or reserve power, e.g. by using peak load power plants such as pumped storage power plants or even storage devices based on batteries. In case of a current situation where not enough electrical power is produced (compared to the current consumption of electrical power), the electrical power management entity indicates—via transmitting electrical power control information—to one or a plurality of power consuming device(s) to postpone expected future demand of electrical power and/or to reduce current demand of electrical power. Likewise, in case of a current situation of excess electrical power being produced, the electrical power management entity indicates—likewise via transmitting electrical power control information—to one or a plurality of power consuming device(s) to prepone expected future demand of electrical power and/or to increase current demand of electrical power. This means that in order to try to always match supply and demand of electrical power, the electrical power management entity continuously verifies power consumption and power generation (by, e.g., using energy meters and/or power meters) such that the flow of energy is always and permanently monitored.

According to a further preferred embodiment of the present invention, the at least one power consuming device is able to be operated—at least for comparably short intervals of time, especially for one or a plurality of seconds or fractions of a second or for one or a plurality of minutes—in a mode of operation of negative demand of electrical power or of surplus energy (supply of electrical power), wherein the electrical power management entity transmits, dependent on the electrical power consumption profile information and/or the electrical power request information, the electrical power control information to the at least one power consuming device such that the negative demand of electrical power (supply of electrical power) by the at least one power consuming device is influenced, especially influenced via preponing or postponing expected future negative demand of electrical power and/or via increasing or decreasing current negative demand of electrical power.

Thereby, it is advantageously possible to achieve a still higher degree of flexibility in managing the system comprising the electrical power generating and/or storing component and the power consuming device.

According to a preferred embodiment of the present invention, the electrical power consumption profile information and/or the electrical power request information comprise at least one out of the following:

information about the expected evolution of the electrical power demand by the at least one power consuming device, information about the postponing flexibility, in terms of time flexibility to use the electrical power later and/or in terms of flexibility regarding lowering the electrical power level, in demanding the electrical power, information about the preponing flexibility, in terms of time flexibility to use the electrical power earlier and/or in terms of flexibility regarding increasing the electrical power level, in demanding the electrical power, information whether the electrical power demand is able to be interrupted after the at least one power consuming device having been activated.

information how often the electrical power demand is able to be interrupted after the at least one power consuming device has been activated.

Thereby, it is advantageously possible, according to the present invention, to precisely indicate the future demand profile and flexibility profile of the at least one power consuming device such that managing and matching the generation and consumption of electrical power is able to be realized more easily and more precisely.

According to a further preferred embodiment of the present invention, the electrical power consumption profile information comprises abstraction model information of the expected behaviour of the at least one power consuming device regarding future (positive and/or negative) electrical power demand, the abstraction model information of the expected behaviour of the at least one power consuming device being especially associated with different typical modes of operation of the at least one power consuming device such as different programs, especially cleaning or working programs, of a household appliance and/or different programs or modes of operation of the at least one power consuming device for industrial, agricultural, transportation or healthcare purposes.

Via using abstraction model information of the electrical power consumption profile information, i.e. of the expected behaviour of the at least one power consuming device regarding future (positive and/or negative) electrical power demand, it is advantageously possible according to the present invention to easily provide, to the electrical power management entity, the respective information to match power generation with power consumption.

According to still a further preferred embodiment of the present invention, the electrical power request information comprises abstraction model information of user or customer requirements regarding the at least one power consuming device (or of a plurality of power consuming devices), the abstraction model information of user or customer requirements being especially associated with time and/or completion requirements of the user or customer regarding the service to be provided by the at least one power consuming device.

Via using abstraction model information of the electrical power request information, i.e. especially abstraction model information regarding the service needs to be met by the power consuming device or the service requirements of the user or users of the power consuming device (e.g. that a washing machine should have finished a specified program or mode of operation at a given time in the future, e.g. the time of expected or typical or return of a user of the power consuming device), it is advantageously possible according to the present invention to easily provide, to the electrical power management entity, the respective information to match power generation with power consumption.

Furthermore, the present invention relates to a system for improved controlling of electrical power usage by at least one power consuming device being connected—via a telecommunications network—to at least one electrical power generating and/or storing component, wherein additionally an electrical power transmission component serves to transmit electrical power between the at least one electrical power generating and/or storing component and the at least one power consuming device, wherein the electrical power generating and/or storing component is associated with an expected and a current electrical power supply profile, and wherein an electrical power management entity is coupled—via the telecommunications network—to the at least one power consuming device such that demand of electrical power consumption by the at least one power consuming device is influenced, by the electrical power management entity, via transmitting electrical power control information between the electrical power management entity and the at least one power consuming device, wherein the system comprises the telecommunications network, especially a mobile communication network, the at least one power consuming device, the electrical power generating and/or storing component, the electrical power management entity, and the electrical power transmission component, wherein the system is configured such that:

an electrical power consumption profile information is transmitted to or accessed by the electrical power management entity, the electrical power consumption profile information being related to the at least one power consuming device or to a mode of operation thereof, a first and/or a second electrical power control information is transmitted, by the electrical power management entity, to the at least one power consuming device, the first electrical power control information indicating to activate a power consumption mode of operation corresponding to the electrical power consumption profile information transmitted to or accessed by the electrical power management entity, whereas the second electrical power control information indicating to modify or to adapt a power consumption mode of operation of the power consuming device, wherein the electrical power management entity is configured to transmit, dependent on the electrical power consumption profile information, the electrical power control information to the at least one power consuming device such that the demand of electrical power by the at least one power consuming device is influenced via postponing or preponing expected future demand of electrical power.

In an exemplary embodiment, the present invention provides a system for improved controlling of electrical power usage by at least one power consuming device being connected—via a telecommunications network—to at least one electrical power generating and/or storing component, wherein additionally an electrical power transmission component serves to transmit electrical power between the at least one electrical power generating and/or storing component and the at least one power consuming device, wherein the electrical power generating and/or storing component is associated with an expected and a current electrical power supply profile, and wherein an electrical power management entity is coupled—via the telecommunications network—to the at least one power consuming device such that demand of electrical power consumption by the at least one power consuming device is influenced, by the electrical power management entity, via transmitting electrical power control information between the electrical power management entity and the at least one power consuming device, wherein the system comprises the telecommunications network, especially a mobile communication network, the at least one power consuming device, the electrical power generating and/or storing component, the electrical power management entity, and the electrical power transmission component, wherein the system is configured such that:

an electrical power consumption profile information is transmitted to or accessed by the electrical power management entity, the electrical power consumption profile information being related to the at least one power consuming device or to a mode of operation thereof, a first and/or a second electrical power control information is transmitted, by the electrical power management entity, to the at least one power consuming device, the first electrical power control information indicating to activate a power consumption mode of operation corresponding to the electrical power consumption profile information transmitted to or accessed by the electrical power management entity, whereas the second electrical power control information indicating to modify or to adapt a power consumption mode of operation of the power consuming device.

According to the present invention, it is advantageously possible—especially with exemplary embodiments of an inventive system—to provide smart scheduling of electrical power consuming devices and appliances such that the need of generation of costly balance energy or the need for costly power buffers/storages is reduced. As regarding exemplary embodiments of the inventive method, exemplary embodiments of the inventive system may be applied to or refer to a more local application level, e.g. involving only a single home or a single industrial site, or involving a plurality of homes or industrial sites, or involving—on a geographically more general level—e.g. the homes and industrial sites of a whole region or even a nation state. At any level, the system comprises at least one electrical power generating and/or storing component and typically a plurality of (but at least one) power consuming device(s).

It is furthermore preferred according to the present invention—especially with respect to the system—that the power consuming device and/or electrical power management entity is configured such that an electrical power request information is transmitted to or accessed by the electrical power management entity, the electrical power request information being related to both a user interaction and the at least one power consuming device, wherein the user interaction especially corresponds to activate the at least one power consuming device.

It is furthermore preferred according to the present invention—also with respect to the system—that the electrical power management entity is configured to transmit, dependent on the electrical power consumption profile information and/or the electrical power request information, the electrical power control information to the at least one power consuming device such that the demand of electrical power by the at least one power consuming device is influenced, especially influenced via postponing or preponing expected future demand of electrical power and/or via reducing or increasing current demand of electrical power, wherein the demand of electrical power is especially influenced in view of adapting supply and demand of electrical power to each other such that differences between current supply and demand of electrical power are as low as possible and as non-volatile as possible.

According to a preferred embodiment of the present invention—also with respect to the system—the electrical power management entity is configured to transmit, dependent on the electrical power request information, the electrical power control information to the at least one power consuming device such that the demand of electrical power by the at least one power consuming device is influenced, especially influenced via postponing or preponing expected future demand of electrical power and/or via reducing or increasing current demand of electrical power, wherein the demand of electrical power is especially influenced in view of adapting supply and demand of electrical power to each other such that differences between current supply and demand of electrical power are as low as possible and as non-volatile as possible.

According to a further preferred embodiment of the present invention—also with respect to the system—the electrical power management entity is configured to transmit, dependent on the electrical power consumption profile information, the electrical power control information to the at least one power consuming device such that the demand of electrical power by the at least one power consuming device is influenced, especially influenced via reducing or increasing current demand of electrical power.

According to a preferred embodiment of the present invention—also with respect to the system—, the electrical power transmission component is a grid or a grid-like electrical power transmission structure, extending within or being related with a home and/or an industrial, agricultural, transportation-related or healthcare site or plant, or an area comprising a plurality of homes and/or a plurality of industrial, agricultural, transportation-related or healthcare sites or plants, or a region or a state comprising a plurality of homes and a plurality of industrial, agricultural, transportation-related or healthcare sites or plants, wherein the electrical power management entity corresponds to either a single entity associated to the entire electrical power transmission component or to a plurality of entities, each one being associated to parts or areas of the electrical power transmission component.

Furthermore, the present invention relates to an electrical power management entity configured to be used in exemplary embodiments of an inventive system and/or configured to be used when executing exemplary embodiments of the inventive method.

Additionally, the present invention relates to a program comprising a computer readable program code which, when executed on a computer and/or on an electrical power management entity and/or on a power consuming device and/or on a network component of a telecommunications network or in part on an electrical power management entity and/or in part on a power consuming device and/or in part on a network component of a telecommunications network, causes the computer and/or the electrical power management entity and/or the power consuming device and/or the network component of the telecommunications network to perform exemplary embodiments of the inventive method.

Still additionally, the present invention relates to computer program product for improved communication between network nodes of a mobile communication network, the computer program product comprising a computer program stored on a storage medium, the computer program comprising program code which, when executed on a computer and/or on an electrical power management entity and/or on a power consuming device and/or on a network component of a telecommunications network or in part on an electrical power management entity and/or in part on a power consuming device and/or in part on a network component of a telecommunications network, causes the computer and/or the electrical power management entity and/or the power consuming device and/or the network component of the telecommunications network to perform exemplary embodiments of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a system for improved controlling of electrical power usage by at least one power consuming device is schematically shown. The system schematically shown in FIG. 1 exemplarily comprises four different power consuming devices, a first power consuming device 20, a second power consuming device 21, a third power consuming device 22, and a fourth power consuming device 23. The system furthermore includes an electrical power generating and/or storing component 40 and an electrical power management entity 30. The electrical power generating and/or storing component 40 is connected to the power consuming devices 20, 21, 22, 23 via an electrical power transmission component 10, this electrical power transmission component 10 especially being a grid or a grid-like electrical power transmission structure that extends within (or is related with) a home and/or an industrial, agricultural, transportation-related or healthcare site or plant, or an area comprising a plurality of homes and/or a plurality of industrial, agricultural, transportation-related or healthcare sites or plants, or a region or a state comprising a plurality of homes and a plurality of industrial, agricultural, transportation-related or healthcare sites or plants. The electrical power management entity 30 corresponds either to a single entity associated to the entire electrical power transmission component 10 or to a plurality of entities, each one being associated to parts or areas of the electrical power transmission component 10.

According to the present invention, the power consuming devices 20, 21, 22, 23 are connected to the at least one electrical power generating and/or storing component 40 via a telecommunications network 100. The telecommunications network 100 is generally a data transmission or data transport network, typically either a fixed line telecommunications network or comprising at least parts that rely on transmitting data wirelessly, such as a mobile communication network, or power consuming devices 20, 21, 22, 23 being connected to the telecommunications network 100 by using a short range wireless local area network (WLAN)

and/or WiFi and/or Bluetooth and/or other wireless communication standards. Hence, the telecommunications network 100 can be provided as an Ethernet communication network, it can comprise optical components and optical data transmission lines as well as wireless data transmission elements.

According to the present invention, the electrical power generating and/or storing component 40 is associated with an expected and a current electrical power supply profile, and the electrical power management entity 30 is coupled to the at least one power consuming device 20, 21, 22, 23 in such a manner that demand of electrical power consumption by the at least one power consuming device 20, 21, 22, 23 is influenced, by the electrical power management entity 30, via transmitting electrical power control information between the electrical power management entity 30 and the at least one power consuming device 20, 21, 22, 23. According to the invention, this can be realized by transmitting an electrical power consumption profile information (or making such an information available) to the electrical power management entity 30. According to the invention, the electrical power consumption profile information is related to the at least one power consuming device 20, 21, 22, 23 or to a mode of operation thereof.

The matching of supply and demand of electrical power is provided by the electrical power management entity 30 and carried out via transmitting first and/or second electrical power control information to the at least one power consuming device 20, 21, 22, 23. The first electrical power control information indicate to activate a specific power consumption mode of operation corresponding to the electrical power consumption profile information transmitted to or accessed by the electrical power management entity 30, and the second electrical power control information indicate to modify or to adapt a power consumption mode of operation of the power consuming device 20, 21, 22, 23.

Typically, energy production by renewable energy sources cannot be controlled as flexibly as traditional or conventional (typically fossil fuel powered) power plants. Today, the power consumption over time is predicted by historical statistics and experience. The energy production by renewable energy sources is also being predicted, with a certain level of accuracy. The remaining difference (in case of lack of electrical power) needs to be provided as so-called balance energy by special power plants, being able to provide energy fast and being able to be dynamically controlled, e.g. power plants based on Pelton turbines are such power plants. However, such balance energy is costly and usually an additional burden for the energy transport networks. A reduction of balance energy is hence desirable.

Especially with energy generation from renewable sources, the possibilities to influence the current production of electrical power is rather limited (e.g. wind- and/or sun-strength dependence). Hence the invention provides a solution to modify or adapt power demand of power consuming devices 20, 21, 22, 23. Depending on the application, such power consuming device 20, 21, 22, 23 can be structured into different classes: Some power consuming devices 20, 21, 22, 23 cannot be delayed in their operation and need to be switched on/off immediately once the user wishes to operate the device, however, other classes of power consuming devices 20, 21, 22, 23 are power consuming devices 20, 21, 22, 23 being able to be switched on with a certain delay, without losing comfort or a loss of functionality. Just as an example, fridges do have the possibility to store energy for typically a relatively long time interval of, say, at least many minutes or even a few hours or up to perhaps 10 or 20 hours due to their efficient insulation. Consequently such power consuming devices 20, 21, 22, 23 may be supplied with electrical power in a delayed manner without risking any loss of comfort or functionality to a user. Just as another example of power consuming devices, the same is often applicable for water heaters. Other examples include washing machines, dish washers etc. being able be scheduled in their operation within a certain range without losing comfort. The examples given here mainly relate to home application or home appliances, however the invention is not restricted to the area home appliances or home devices: Devices or appliances in other areas such as industrial, agriculture, automotive, healthcare etc., are likewise able to be classified in the same way.

Such devices as mentioned above are also referred to as the Internet of Things (IoT) or internet-of-things devices are becoming increasingly equipped with networking functionality and are becoming increasingly smart by adding additional computation functions on top of their base functionality. However, one of the main problems to be solved in the field of internet-of-things, is the description of the different devices, i.e. expressing the capabilities, identifiers etc. in a semantic manner being able to be understood and interpreted correctly by other (smart) machines or devices. The art of describing such devices is typically subject to the field of ontology and typically requires an abstraction information model such as it is partly used in global internet-of-things specifications. E.g., in the exemplary case of a refrigerator, such an abstraction information model might comprise common characteristics such as a vendor-specific characteristic, a version number, a device model, as well as device-specific characteristics, such as a door status information, a door alarm on/off information, a temperature unit information, etc. Likewise, in the exemplary case of a washing machine, such an abstraction information model might comprise common characteristics such as a vendor-specific characteristic, a version number, a device model, as well as device-specific characteristics, such as a spin level information, a water flow information, a water level information, etc.

According to the present invention, such abstraction information model also comprise electrical power consumption profile information providing general information about the possibility—for the electrical power management entity 30—to influence the current and future consumption of electrical power. In order to provide an efficient management of power consuming devices 20, 21, 22, 23, on the one hand side the current generated power should be known. This can either be measured and signaled locally (within a house, company property/facilities), but in case of a "geographically or functionally" larger area/grid also being measured, aggregated and controlled by a controlling entity responsible for a larger area (power grid section etc.). Together with the current generated power as well as the typical predicted evolution of generated power, the other parameter for matching power supply and demand typically refers to the knowledge about the power consumption profile P(t)

to the flexibility in time the power consuming devices 20, 21, 22, 23 can be delayed in switching on compared to the originally indented point in time to the flexibility in time the power consuming devices 20, 21, 22, 23 can be switched on in advance to the originally indented point in time to the information whether the power can be interrupted again, after initial switch on whether a "penalty time" needs to be applied before the device is allowed to be switched on again how often the power consuming devices 20, 21, 22, 23 are allowed to be interrupted.

According to the present invention, such information about the abstract information model are made available to a respective controlling entity or platform (i.e. the electrical power management entity 30). In this case the controlling entity or IoT platform (electrical power management entity 30) is beneficially able to calculate the optimal switching point or switching time for all power consuming devices 20, 21, 22, 23 within the scope of the controller (i.e. the area for which the electrical power management entity 30 responsible).

Figure 2:
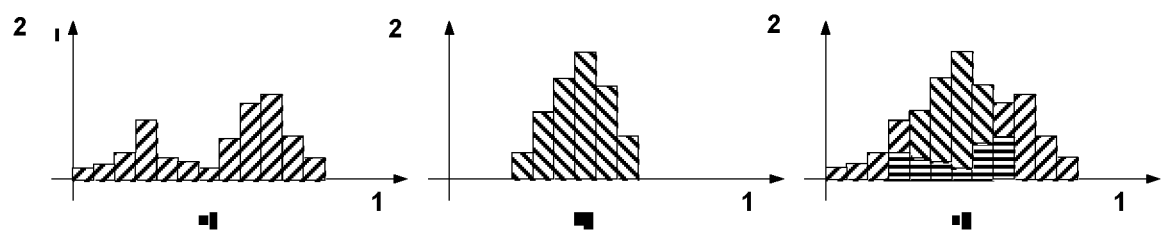
FIG. 2 schematically illustrates an exemplary power consumption diagram, a power generation diagram and a superposition of a power generation and consumption diagram.

FIG. 2 schematically shows an exemplary power consumption diagram (left side of FIG. 2), a power generation diagram (middle part of FIG. 2) and a superposition of a power generation and consumption diagram (right side of FIG. 2), i.e the aggregated power consumption of a certain grid, the respective energy offer (energy production, e.g. by photovoltaic production, wind power etc. . . . ) within a certain grid. The right side of FIG. 2 shows the energy flow between the grid and the electrical power generating and/or storing component 40 without any proactive management of power consuming appliances. Hatched areas (with an inclination to the right) in the left side of FIG. 2 correspond to power consumption. Hatched areas (with an inclination to the left) in the middle part of FIG. 2 correspond to power production (or generation). Hatched areas with an inclination to the right in the right side of FIG. 2 are representing the amount of energy being obtained from the supplying grid (i.e. the consumption of electrical power exceeds the generation of electrical power), horizontally hatched areas in the right side of FIG. 2 are representing the amount of energy being generated within the (power managed) grid and instantaneous consumed power, and hatched areas with an inclination to the left in the right side of FIG. 2 are representing the amount of energy being generated in excess within the (power managed) grid and, hence, fed back to the supplying grid. In order to reduce the amount of balance energy needed (i.e. the hatched areas with inclination in the right side of FIG. 2) and to reduce the load for the supplying grid, the energy shall preferably being consumed instantaneously once it is generated within the grid, i.e. consequently the hatched areas with inclination areas shall be decreased as much as possible and the horizontally hatched areas should be maximized in the right side of FIG. 2.

According to the present invention, the aggregated power consumption (within a considered grid or part thereof) are parted into the individual power consumptions of the devices on the grid (or respective part thereof). According to the present invention, different power consuming devices 20, 21, 22, 23 and device classes contribute to the overall power consumption. The following additional information/parameters shall be assumed as being part of the internet-of-things device profile (i.e. the electrical power consumption profile information):

some power consuming devices 20, 21, 22, 23 having a power consumption profile (corresponding to an electrical power consumption profile information) such that these are not able to be delayed or interrupted with regards to their operation;

some power consuming devices 20, 21, 22, 23 can only be delayed a maximum of one time unit but can be switched on three time units in advance;

some power consuming devices 20, 21, 22, 23 can only be delayed a maximum of two time units;

some power consuming devices 20, 21, 22, 23 create a power consumption profile (corresponding to an electrical power consumption profile information) and can only be delayed a maximum of two time units but can be switched on three time units in advance, and are allowed to be interrupted two times within the expected operation time.

According to the present invention, it is advantageously possible that with the respective knowledge about the power consumption profile of a sufficiently important number of power consuming devices 20, 21, 22, 23 (if not all power consuming devices 20, 21, 22, 23 within the considered grid or part thereof) that with the given or anticipated actual power on offer (i.e. the generation of electrical power), the power management entity 30, is able to schedule the device operation (of the power consuming devices 20, 21, 22, 23) in a way that the demand of balance energy can be reduced.

With additional information and knowledge such as listed above regarding the number of possible interruptions and the like, i.e. information having regard to scheduling flexibility as well as constraints with regards to power interruptions, the functionality of the grid of the considered part of the grid can be further enhanced.

According to the present invention, the functionality can be further enhanced with more accurate predictions of the power generation, e.g. considerations of weather conditions in case of power generation by photovoltaic or wind.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for controlling electrical power usage by at least one power consuming device connected via a telecommunications network to at least one electrical power component, wherein an electrical power transmission component is configured to transmit electrical power between the at least one electrical power component and the at least one power consuming device, wherein the at least one electrical power component is associated with an expected electrical power supply profile and a current electrical power supply profile, and wherein an electrical power management entity is coupled—via the telecommunications network—to the at least one power consuming device, wherein the method comprises:
- obtaining, by the electrical power management entity, electrical power request information, wherein the electrical power request information is related to both a user interaction and the at least one power consuming device;
- obtaining, by the electrical power management entity, electrical power consumption profile information, wherein the electrical power consumption profile information is related to the at least one power consuming device; and
- transmitting, by the electrical power management entity, electrical power control information to the at least one power consuming device based on the obtained electrical power consumption profile information and the obtained electrical power request information to control consumption of electrical power by the at least one power consuming device so as to balance a current aggregate supply and demand of electrical power and to minimize volatility.

2. The method according to claim 1, wherein the user interaction corresponds to activating the at least one power consuming device.

3. The method according to claim 1, wherein controlling consumption of electrical power by the at least one power consuming device comprises:
- postponing a future demand for electrical power by the at least one power consuming device; or
- preponing a future demand for electrical power by the at least one power consuming device.

4. The method according to claim 1, wherein controlling consumption of electrical power by the at least one power consuming device comprises:
- reducing a current demand for electrical power by the at least one power consuming device; or
- increasing a current demand for electrical power by the at least one power consuming device.

5. The method according to claim 1, wherein the at least one power consuming device is configured to be operated in multiple modes of operation, including a first mode of negative demand for electrical power and a second mode of surplus energy.

6. The method according to claim 1, wherein the electrical power consumption profile information comprises at least one out of the following:
- information about the expected evolution of the electrical power demand by the at least one power consuming device;
- information about the postponing flexibility, in terms of time flexibility to use the electrical power later and/or in terms of flexibility regarding lowering the electrical power level, in demanding the electrical power;
- information about the preponing flexibility, in terms of time flexibility to use the electrical power earlier and/or in terms of flexibility regarding increasing the electrical power level, in demanding the electrical power;
- information about whether the electrical power demand is able to be interrupted after the at least one power consuming device having been activated; or
- information about how often the electrical power demand is able to be interrupted after the at least one power consuming device has been activated.

7. The method according to claim 1, wherein the electrical power consumption profile information comprises abstraction model information of the expected behavior of the at least one power consuming device regarding future electrical power demand, wherein the abstraction model information of the expected behavior of the at least one power consuming device is associated with different typical modes of operation of the at least one power consuming device.

8. The method according to claim 1, wherein the electrical power request information comprises abstraction model information of user or customer requirements regarding the at least one power consuming device, wherein the abstraction model information of user or customer requirements is associated with requirements of the user or customer regarding the service to be provided by the at least one power consuming device.

9. The method according to claim 1, wherein the electrical power request information comprises at least one out of the following:
- information about the expected evolution of the electrical power demand by the at least one power consuming device;
- information about the postponing flexibility, in terms of time flexibility to use the electrical power later and/or in terms of flexibility regarding lowering the electrical power level, in demanding the electrical power;
- information about the preponing flexibility, in terms of time flexibility to use the electrical power earlier and/or in terms of flexibility regarding increasing the electrical power level, in demanding the electrical power;
- information about whether the electrical power demand is able to be interrupted after the at least one power consuming device having been activated; or
- information about how often the electrical power demand is able to be interrupted after the at least one power consuming device has been activated.

10. A system for controlling electrical power usage, the system comprising:
- at least one power consuming device connected—via a telecommunications network—to at least one electrical power component;
- an electrical power transmission component is-configured to transmit electrical power between the at least one electrical power generating and/or storing component and the at least one power consuming device;
- the at least one electrical power component, wherein the at least one electrical power component is associated with an expected electrical power supply profile and a current electrical power supply profile;
- an electrical power management entity is coupled—via the telecommunications network—to the at least one power consuming device; and
- the telecommunications network, wherein the telecommunications network is a mobile communication network;
- wherein the electrical power management entity is configured to obtain electrical power request information and electrical power consumption profile information, wherein the electrical power request information is related to both a user interaction and the at least one power consuming device, and wherein the electrical power consumption profile information is related to the at least one power consuming device;
- wherein the electrical power management entity is further configured to transmit a first electrical power control information to the at least one power consuming device based on the obtained electrical power consumption profile information and the obtained electrical power request information to control consumption of electrical power by the at least one power consuming device so as to balance a current aggregate supply and demand of electrical power and to minimize volatility.

11. The system according to claim 10, wherein the user interaction corresponds to activating the at least one power consuming device.

12. The system according to claim 10, wherein controlling consumption of electrical power by the at least one power consuming device comprises:
- postponing a future demand for electrical power by the at least one power consuming device;
- preponing a future demand for electrical power by the at least one power consuming device;
- reducing a current demand for electrical power by the at least one power consuming device; or
- increasing a current demand for electrical power by the at least one power consuming device.

13. The system according to claim 10, wherein the electrical power transmission component is a grid or a grid-like electrical power transmission structure, extending within or being related to:
- a home and/or an industrial, agricultural, transportation-related or healthcare site or plant; or
- an area comprising a plurality of homes and/or a plurality of industrial, agricultural, transportation-related or healthcare sites or plants; or
- a region or a state comprising a plurality of homes and a plurality of industrial, agricultural, transportation-related or healthcare sites or plants;
- wherein the electrical power management entity corresponds to either a single entity associated to the electrical power transmission component or to a plurality of entities, each one being associated to parts or areas of the electrical power transmission component.

14. The system according to claim 10, wherein the electrical power management entity is configured to balance power demand of a plurality of power consuming devices relative to expected electrical power supply profile of the at least one electrical power component.

15. The system according to claim 14, wherein the plurality of power consuming devices comprises a plurality of types of power consuming devices, where in the plurality of types of power consuming devices include:
- a first type for which operation cannot be delayed; and
- a second type for which operation is delayable.

16. A non-transitory computer-readable medium having processor-executable instructions stored thereon for controlling electrical power usage by at least one power consuming device connected—via a telecommunications network—to at least one electrical power component, wherein an electrical power transmission component is configured to transmit electrical power between the at least one electrical power component and the at least one power consuming device, wherein the at least one electrical power component is associated with an expected electrical power supply profile and a current electrical power supply profile, and wherein an electrical power management entity is coupled—via the telecommunications network—to the at least one power consuming device, wherein the processor-executable instructions, when executed, facilitate performance of the following:
- obtaining, by the electrical power management entity, electrical power request information, wherein the electrical power request information is related to both a user interaction and the at least one power consuming device;
- obtaining, by the electrical power management entity, electrical power consumption profile information, wherein the electrical power consumption profile information is related to the at least one power consuming device; and
- transmitting, by the electrical power management entity, electrical power control information to the at least one power consuming device based on the obtained electrical power consumption profile information and the obtained electrical power request information to control consumption of electrical power by the at least one power consuming device so as to balance a current aggregate supply and demand of electrical power and to minimize volatility.

\* \* \* \* \*